United States Patent [19]

Larson

[11] 4,419,728
[45] Dec. 6, 1983

[54] CHANNEL INTERFACE CIRCUIT PROVIDING VIRTUAL CHANNEL NUMBER TRANSLATION AND DIRECT MEMORY ACCESS

[75] Inventor: Allen L. Larson, Thornton, Colo.

[73] Assignee: Bell Telephone Laboratories, Incorporated, Murray Hill, N.J.

[21] Appl. No.: 276,060

[22] Filed: Jun. 22, 1981

[51] Int. Cl.³ .............................................. G06F 3/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,588,831 | 6/1971 | Figueroa et al. | 364/200 |
| 4,092,715 | 5/1978 | Scriver | 364/200 |
| 4,093,981 | 6/1978 | McAllister et al. | 364/200 |
| 4,133,030 | 1/1979 | Huettner et al. | 364/200 |
| 4,155,119 | 5/1979 | De Ward et al. | 364/200 |
| 4,156,907 | 5/1979 | Rawlings et al. | 364/200 |
| 4,189,769 | 2/1980 | Cook et al. | 364/200 |
| 4,225,919 | 9/1980 | Kyu et al. | 364/200 |
| 4,228,496 | 10/1980 | Katzman et al. | 364/200 |

OTHER PUBLICATIONS

*Electronic Design* 12, Jun. 7, 1979, "Data Communications Part Three," pp. 98–104, Alan J. Weissberger.

*Primary Examiner*—Mark E. Nusbaum
*Assistant Examiner*—Mark P. Watson
*Attorney, Agent, or Firm*—J. M. Graziano

[57] ABSTRACT

The subject channel interface circuit functions to provide a high speed interface between a processor and a data link, which link carries data messages having virtual addresses. The message handler is programmable and serves to translate the header portion of the data message from a virtual address into a hardware memory address, which is used to activate a specific location in the processor memory. The data portion of the data message is then directly inputted to this memory location (i.e., DMA) and the appropriate file pointers are reset. When a complete file is received and stored in memory, the message handler generates a processor interrupt.

Thus, the subject message handler performs all the data receiving tasks, including file storage and linking, without requiring the involvement of the associated processor. All known prior art message handler circuits require extensive processor involvement in the data storage operation and thereby significantly reduce the effective data transfer capabilities of the link.

15 Claims, 4 Drawing Figures

CHANNEL INTERFACE CIRCUIT PROVIDING VIRTUAL CHANNEL NUMBER TRANSLATION AND DIRECT MEMORY ACCESS

This application is related to an application of A. L. Larson, Ser. No. 276,074, entitled *CHANNEL INTERFACE CIRCUIT WITH HIGH SPEED DATA MESSAGE HEADER TRANSLATION*, filed on the same date hereof.

FIELD OF THE INVENTION

This invention relates to interface circuits, and in particular, to a channel interface circuit which serves to interconnect a communication channel with a processor and its associated memory. The subject channel interface circuit provides a high speed interface which carries data messages from the communication channel to the processor memory without requiring the intervention of the associated processor.

DESCRIPTION OF THE PRIOR ART

Prior art interface circuits which inteconnect a processor and a communication channel are used merely as a buffer. They function to store data messages which appear on the communication channel and generate an interrupt each time a data message is received. The difficulty with this arrangement is that the processor spends an inordinate amount of real time serving the interrupts from the interface circuit to merely store data in its associated memory. A signficant portion of this real time is expended in deoding the header of the data message to determine whether the data message is destined for the associated processor and, if so, where in the processor memory it is to be stored. Prior art interface circuits do nothing to expedite this decoding process and, in fact, have little built-in intelligence and serve merely as a simple buffer, thereby requiring the associated processor to accomplish the decoding and message storing tasks. Heretofore, this has not been a significant problem since the processors are either not real time limited or are operating in a batch processing mode. However, in business communication systems, this prodigal expenditure of real time is a significant impediment to system performance.

SUMMARY OF THE INVENTION

The subject channel interface circuit acts as a message handler which functions to provide a high speed interface between a processor memory and a data communication channel. The communication channel carries data messages having a header field which specifies a virtual address. The subject channel interface circuit is programmable and serves to dynamically translate the header portion of the data message as it is being received from a virtual address into a hardware memory address, which is used to activate a specific location in the processor memory. The data portion of the data message is then directly inputted (DMA) to this memory location and the appropriate buffer points are reset. Only when a complete data message has been received and stored in the processor memory does the channel interface circuit generate a processor interrupt to inform the processor that a complete data message is now stored in its memory. Thus, the subject channel interface circuit performs all the data receiving tasks including message storage and linking without requiring the involvement of the associated processor. This saves processor real time and increases the speed of the effective data transfer between the communication channel and the processor since there is no delay while the processor is required to access every data message and either store same in its memory or provide address information as to where the message should be stored.

BRIEF DESCRIPTION OF THE DRAWINGS

FIG. 4 illustrates the manner in which FIGS. 1 and 2 are to be connected.

DETAILED DESCRIPTION, FIGS. 1 AND 2

The subject channel interface circuit 100 serves to interconnect a communication channel 120 with processor 101 and processor memory 102 via the address, data and control busses of processor 101. It is assumed that communication channel 120 carries data messages having a header field which specifies the destination processor's address and a virtual channel member. Channel interface circuit 100 monitors communication channel 120 to determine whether one of these data messages is destined for processor memory 102. If this is the case, channel interface circuit 100 stores the data messages that are received from communication channel 120 directly in processor memory 102 without requiring the involvement of processor 101. Similarly, messages originated by processor 101 which are to be transmitted or communication channel 120 are stored in processor memory 102 and channel interface circuit 100 directly accesses these data messages in processor memory 102 and outputs them on communication channel 120 without requiring the involvement of processor 101.

Reader/Writer Queues

Figure 3:
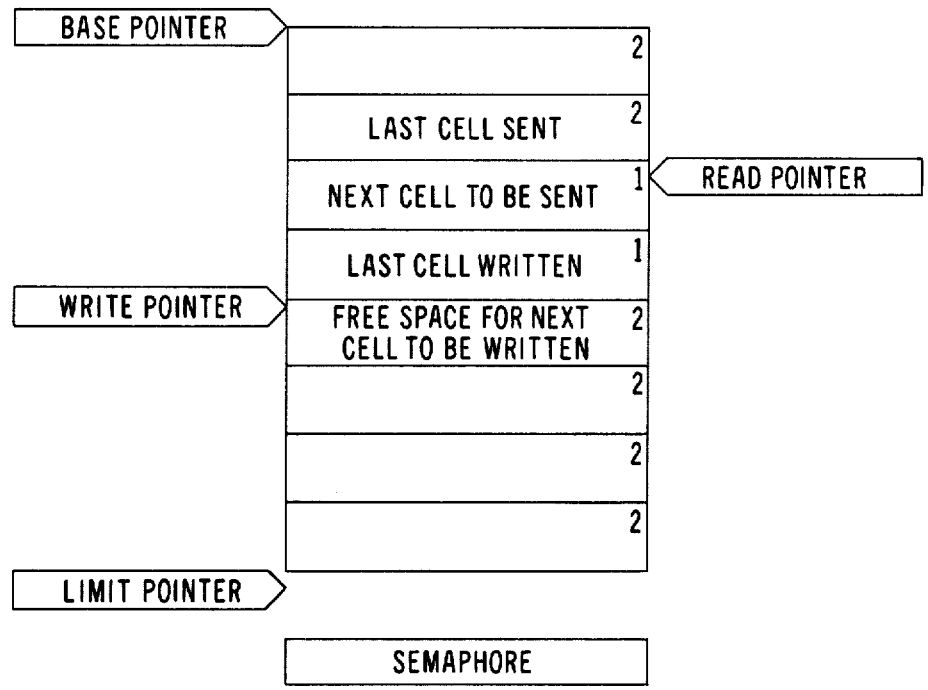
FIG. 3 illustrates the structure of a reader/writer queue used by the subject invention.
Figure 4:
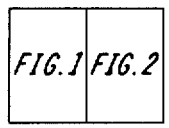

A significant data communication structure used in this arrangement is the reader/writer queue, a sample of which is illustrated in FIG. 3. This queue is simply a segment of processor memory 102 that has been designated by processor 101 as a storage location for data messages that are to be transmitted or received. In the subject embodiment, there will be reader/writer queues established for data messages received from communication channel 120 as well as reader/writer queues for data messages to be transmitted on communication channel 120. The basic structure of these queues, as illustrated in FIG. 3, will be uniform for these applications and it will be beneficial to describe the reader/writer queue structure at this time. The basic reader/writer queue is described by a set of memory queue data which comprises four pointers and a semaphore. Two of these pointers define the bounds of the queue and these are the base pointer, which indicates the memory address location at which the queue begins, and the limit pointer which indicates the memory address location at which the queue terminates. The remaining two pointers are the write and read pointers and these indicate respectively where messages are to be written into this queue or read out of the queue. For the sake of this description, the read pointer will designate the memory address location within which is stored the first byte of the next data message to be sent either to processor 101 or to communication channel 120. The write pointer indicates the memory address location into which the first byte of the next received data message is to be written by either processor 101 or channel interface circuit 100.

In viewing FIG. 3, it is evident these pointers are changed each time a circuit accesses the particular queue. Therefore, before a queue is accessed by either processor 101 or channel interface circuit 100, all the appropriate pointers are read by the requesting circuit so that updated pointer information is available to the requesting circuit. To prevent any queue contention problems, the semaphore is used and generally comprises a particular bit pattern stored in the memory address location immediately following the memory location identified by the limit pointer. The semaphore is essentially a flag to indicate to a circuit seeking access to the queue whether the queue is idle or currently being accessed by another circuit. In this fashion, the semaphore prevents concurrent access to a queue and the associated confusion due to the transient nature of the read and write pointers during the concurrent read and write operations.

Another problem in the use of reader/writer queues is the over writing of a queue so that new data is written into a completely full queue before previously stored data messages have been read out. To prevent such occurrences, the semaphore can be used to set a flag indicating when the queue is full so that newly arrived data messages will not be written therein. An alternative protection mechanism is to leave a blank memory location or data cell between the read write and pointers if the queue is full and to have the read and the write pointers equal if the queue is empty. This scheme allows a requesting circuit to determine whether the queue is full or if it is totally empty. A third alternative commonly used is to have the accessing circuit seize control of the processor busses when the queue becomes full so that another circuit cannot access the memory to write additional data messages therein.

Selecting A Virtual Channel Number

To assist in the understanding of this circuit, the outputting of a typical data message will be described. As previously mentioned, data messages being transmitted on communication channel 120 have a header field which specifies both the processor address and a virtual channel number. The obvious question to ask at this time is: "How are virtual channel numbers assigned to data messages transmitted between two processors?". The answer to this question is that there exists a standard initial interprocessor communication arrangement to define virtual channel numbers. Processor 101, communicates with another processor (not shown) connected to communication channel 120 by accessing this other processor and selecting a virtual channel number that will be used for this intercommunication. This access is accomplished by processor 101 outputting on communication channel 120, a data message containing the address of the destination processor and a virtual channel number of zero, which indicates to the destination processor that this is an initial communication setup message intended for the destination processor. The destination processor responds to the initial message from processor 101 in similar fashion by transmitting a data message on communication channel 120 having a header field containing the address of processor 101 and a virtual channel number of zero. By exchanging such messages, processor 101 and the destination processor accomplish the necessary handshaking to identify a commonly acceptable virtual channel number and to identify, in their respective systems, the actual programs that are requesting this interconnection.

Thus, once a virtual channel number has been selected for a particular processor-to-processor intercommunication, such information is included in the header of the data message, and the entire data message is stored in processor memory 102 in the reader/writer queue that is used for outgoing data messages. Since all outgoing data messages having a common destination, communication channel 120, there will be just one reader/writer queue for outgoing data messages and all outgoing messages are stored therein.

Figure 1:
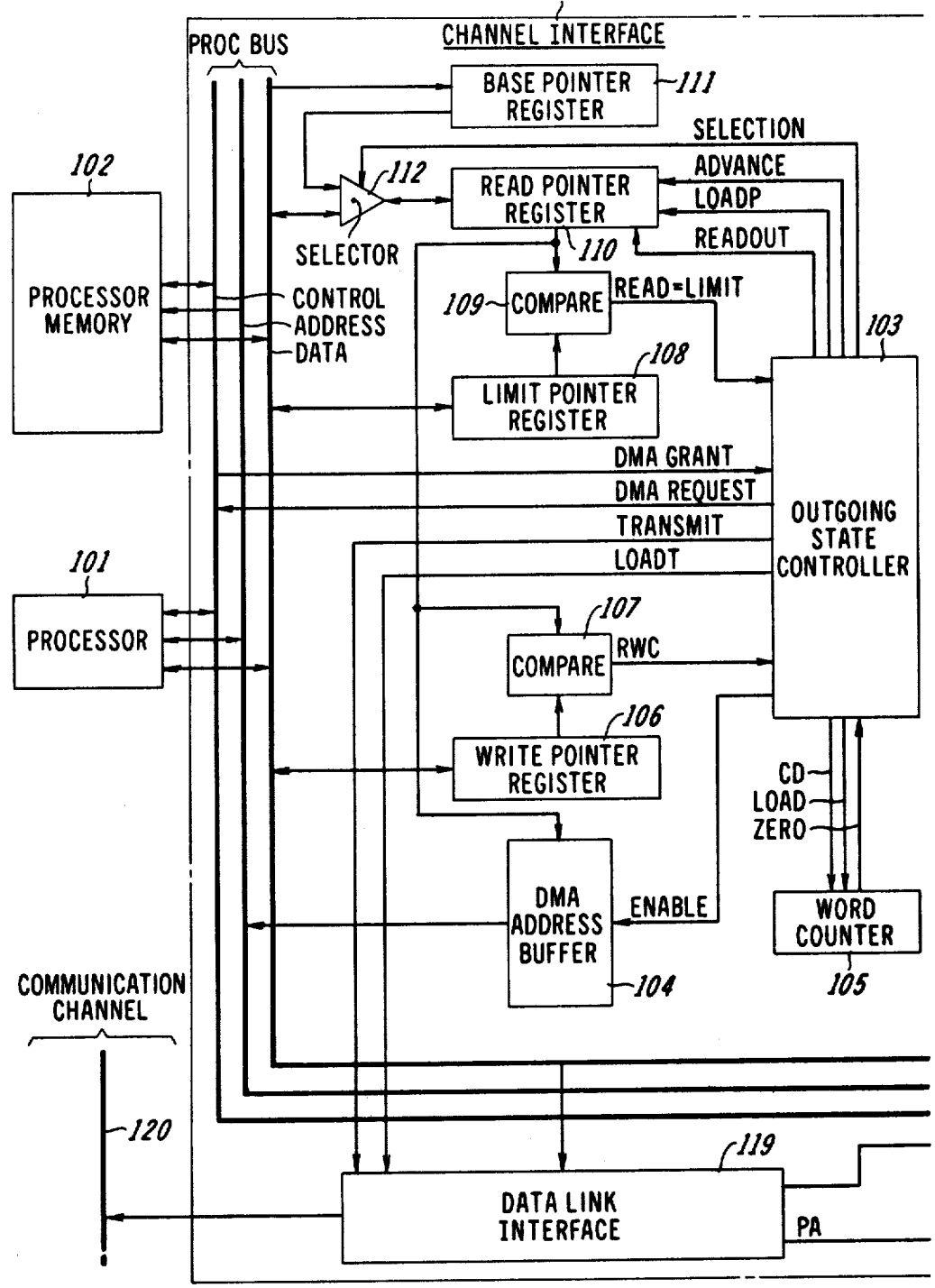
FIGS. 1 and 2 illustrate the link interface circuit of my invention.

Transmitter—FIG. 1

The outgoing or transmitter portion of channel interface circuit 100 is illustrated on FIG. 1 and is controlled by outgoing state controller 103. Outgoing state controller 103 may be implemented in a variety of ways, and the subject circuit uses a microprocessor for this function. This microprocessor would be appropriately programmed, in well-known fashion, to provide the control and timing signals necessary for the coherent operation of channel interface circuit 100.

The transmitter portion of channel interface circuit 100 contains a number of registers which are loaded with the various pointers associated with the outgoing reader/writer queue. This register loading is accomplished by outgoing state controller 103, which requests access to the outgoing reader/writer queue in processor memory 102 via the processor control, address and data busses. When processor 101 grants access, outgoing state controller 103, via enable leads (not shown) sequentially: (1) loads the base pointer into base pointer register 111, (2) loads the read pointer via selector 112 into read pointer register 110, (3) loads the limit pointer into limit pointer register 108 and (4) loads the write pointer in write pointer register 106.

Outgoing state controller 103 is responsive to a comparison operation performed by compare circuit 107 to output a data message on communication channel 120 if one such data message is stored in the outgoing reader/writer queue. This determination is accomplished by compare circuit 107 which performs the operation of comparing the contents of read pointer register 110 and write pointer register 106. If these two differ, compare circuit 107 outputs a logic signal on lead RWC to outgoing state controller 103, to indicate that the two pointers are not the same and therefore the outgoing reader/writer queue contains a data message to be transmitted. Outgoing state controller 103 responds to this logic signal on lead RWC by activating lead DMA REQUEST, which signal is applied to the processor control bus to request access to the processor busses to that channel interface circuit 100 can access processor memory 102.

Memory Access

Processor 101 indicated to channel interface circuit 100 that the processor busses are available by placing the appropriate logic signal on lead DMA GRANT. This signal causes outgoing state controller 103 to enable, via leads ENABLE and READOUT, read pointer register 110 to output it's contents to DMA address buffer 104 which, in turn, applies this address to the processor address bus. This operation accesses the memory address location in processor memory 102 which contains the first byte of the next data message to be transmitted. It is assumed in this system that all data messages are a fixed length, so word counter 105 is then reset by outgoing state controller 103 placing an enable signal on lead LOAD. In this embodiment, word counter 105 is a hard-wired down counter having a fixed range, which range equals the length of the standard data message. Thus, when outgoing state controller 103 places a count signal on lead CD to word counter 105, this causes word counter 105 to decrement the count by one and this process continues until a count of zero is obtained, thereby indicating that a complete data message has been transmitted. Each time the count in word counter 105 is decremented, outgoing state controller 103 places an address increment signal on lead ADVANCE to read pointer register 110. In this fashion, the address stored in read pointer register 110 and transmitted by DMA address buffer 104 onto the processor address bus is incremented one memory location at a time until a complete data message has been outputted as indicated by word counter 105 outputting a zero indication signal to outgoing state controller 103 on lead ZERO.

As each hardware address is placed on the processor address bus, the contents of that memory location in processor memory 102 are read by processor memory 102 onto the processor data bus. This data is loaded into data link interface 119 when outgoing state controller 103 places an enable signal on lead LOADT. This data is outputted in standard fashion by data link interface 119 onto communication channel 120 again under the control of outgoing state controller 103 via the lead TRANSMIT. When the entire data message is transmitted, state controller 103 resets itself and again reads the various pointers in the outgoing reader/writer queue to determine whether another message is stored in the outgoing reader/writer queue to be transmitted on communication channel 120.

The structure and operation of data link interface 119 are both well-known in the art. In particular, in Electronic Design Magazine of June 7, 1979, there appeared an article entitled, "Data Communications: Part Three," by Alan J. Weissberger (pages 98–104) wherein a typical channel interface circuit is described. The receiver/transmitter circuit described in this publication is a well-known circuit element which would be of the type to be used to implement data link interface 119. This circuit functions in well-known fashion to receive the serial digital data signals appearing on communication channel 101, reshape these signals for use in channel interface circuit 100 and extract a clock signal from these digital data signals. Similarly, signals to be transmitted on communication channel 120 are formatted and timing is provided by data link interface 119.

Wrap Around Queue

In this system, when the read pointer reaches the end of the queue it must be reinitialized to the beginning of the queue since this is a wrap around queue with messages being handled on a first-in, first-out basis. This reinitialization is accomplished by compare circuit 109 monitoring the contents of limit pointer register 108 and read pointer register 110. When the contents of these two registers are identical, compare circuit 109 outputs a signal on lead READ=LIMIT to outgoing state controller 103. This signal stimulates outgoing state controller 103 to cause selector 112, via lead SELECTION, to switch the contents of base pointer register 111 into read pointer register 110, which has been enabled via lead LOADP, thereby moving the read pointer once again to the beginning of the queue.

Figure 2:
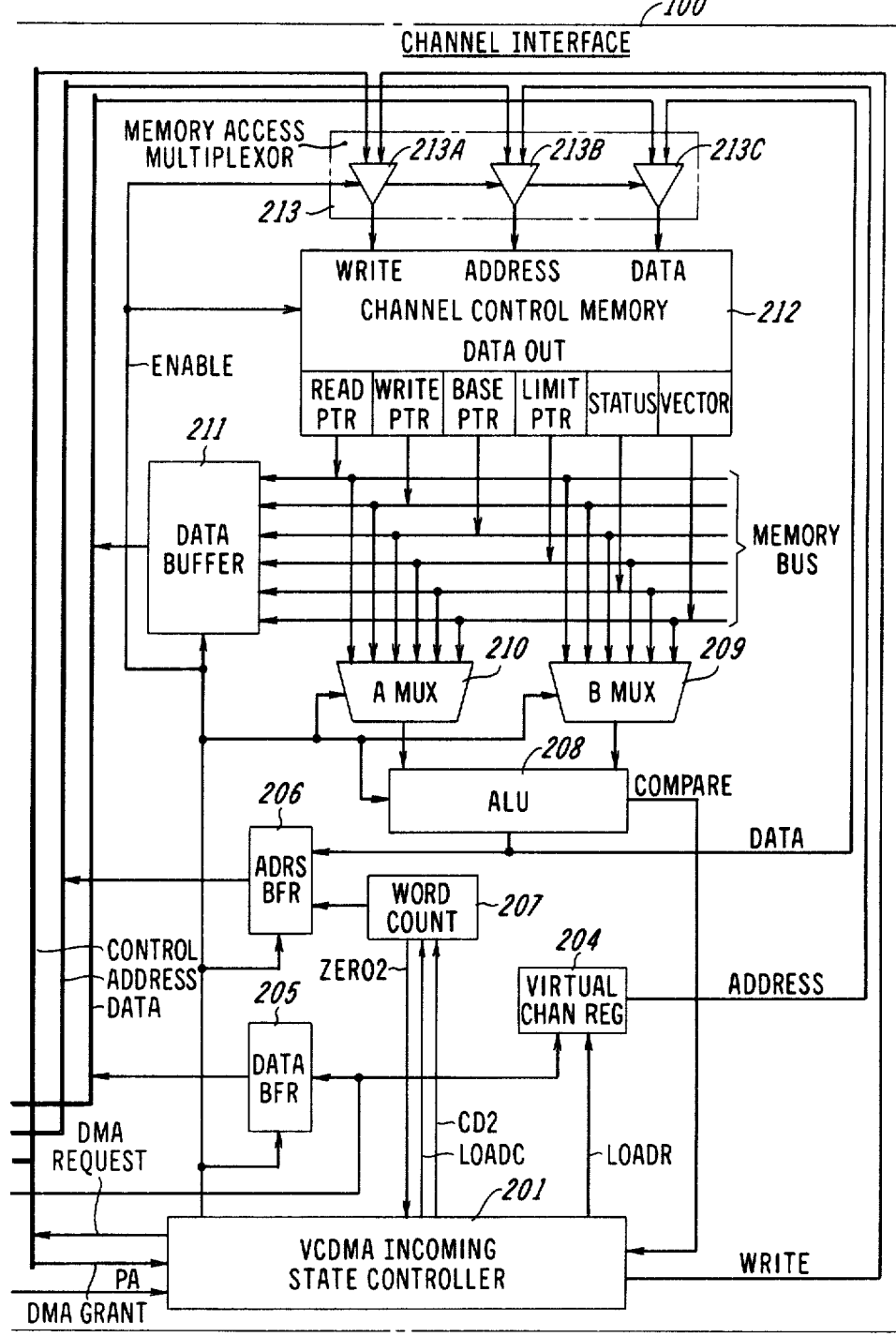

Incoming Data Message Circuit, FIG. 2

The incoming portion of communication channel interface circuit 100 is illustrated in FIG. 2 and functions to receive data messages from communication channel 120, interpret the header part of the data message and store the data messages destined for processor 101 in processor memory 102. This segment of channel interface circuit 100 is controlled by incoming state controller 201 which, as with outgoing state controller 103, may be a microprocessor. In fact, both incoming 201 and outgoing 103 state controllers may be the same circuit equipped with two resident programs, one for incoming data message control and the other for outgoing message control.

As was discussed above, the data message format comprises a header containing destination processor address and virtual channel information as well as the data itself. A typical processor-to-processor intercommunication is established as discussed above and it is assumed for the description of FIG. 2 that the virtual channel members for a number of processor-to-processor intercommunications have already been determined and data messages are being transmitted on communication channel 120 to processor 101. When a processor-to-processor communication is initialized, processor 101 writes the pertinent information relating to this communication in channel control memory 212. In particular, a reader/writer queue such as that shown in FIG. 3 is established for each processor-to-processor communication that is to transpire. Thus, for a 32-channel communication scheme, channel control memory 212 might be implemented by a 32 by n RAM memory, where n indicates the number of bits required to identify all the characteristics of this intercommunication.

As we discussed above, a typical reader/writer queue contains a read pointer, a write pointer, a base pointer and a limit pointer. In addition, with every intercommunication there would be additional information required such as interrupt vector information which would comprise the address of a service routine in processor 101 which is to be called when a data message or a series of n data messages have been received by channel interface circuit 100 and stored in processor memory 102. Additional channel characteristic information comes under the title of status which is a catch-all phase for any maintenance or identification information that processor 101 wishes to associate with the particular processor-to-processor intercommunication using this particular virtual channel. Typical status information may be a count of the number of errors in transmission, an identification of the type of communication (block transfer, simple message, etc.), and the status of the channel, whether open or closed for transmission. Therefore, processor 101 in a 32-channel system would establish 32 reader/writer queues in processor memory 102 and would write the above-described information relating to each of these reader/writer queues into channel control memory 212 via memory access multiplexer 213. Processor 101 accesses the information stored in channel control memory 212 via data buffer 211, which access of course is orchestrated by incoming state controller 201.

To further describe the incoming portion of channel interface circuit 100, it is advantageous to describe the receipt of a typical data message from communication channel 120. When a data message appears on communication channel 120, data link interface 119 receives the bits that are being transmitted and decodes the header portion of the data message to the extent that it determines whether the destination processor named in the header is processor 101. If the data message is for processor 101, data link interface 119 signifies this situation to incoming state controller 201 via lead PA and incoming state controller 201, via an enable signal on lead LOADR, stores the virtual channel number contained in the header in virtual channel register 204. Incoming state controller 201 activates channel control memory 212 via bus ENABLE and the address stored in virtual channel register 204 is applied via leads ADDRESS and memory access multiplexer 213B to the address leads of communication channel memory 212. Application of the virtual channel number to these address leads causes all the relevant information concerning this virtual channel which is stored in channel control memory 212 to be outputted on the MEMORY BUS shown on FIG. 2 interconnecting data buffer 211, multiplexers 209 and 210 and channel control memory 212.

Incoming state controller 201 sequences through a series of operations in the process of taking the data message from data link interface 119 and storing same in processor memory 102. One of the first steps in this operation is the comparison of the read and write pointers, as discussed above, to determine whether the associated reader/writer queue is full. This is accomplished by incoming state controller 201 switching the read pointer and write pointer information from channel control memory 212 through A multiplexer 210 and B multiplexer 209 respectively to arithmetic logic unit 208. Arithmetic logic unit 208 performs a standard comparison operation to determine whether the read and the write pointers are equal. If they are not equal, there is room in the queue for the storage of additional data messages and this situation is indicated by the appropriate logic signal on lead COMPARE. Incoming state controller 201 responds to the signal on lead COMPARE by placing a DMA request signal on the DMA REQUEST lead of the processor control bus to request access to the processor busses. Processor 101 signifies acquiescence to the request by a logic signal on lead DMA GRANT, thereby causing incoming state controller 201 to activate address buffer 206, via bus ENABLE, which switches the read pointer information being outputted by channel control memory 212 through arithmetic logic unit 208 and address buffer 206 to the processor address bus. In the meantime, the data being received by data link interface 119 is stored in data buffer 205 and is outputted on a byte-by-byte basis to the processor data bus as incoming state controller 201 causes word count circuit 207 to increment the hardware address stored in address buffer 206. Thus, data is stored in the reader/writer queue associated with the virtual channel and the write pointer is incremented until the entire data message is stored in the queue as signified by word count circuit 207 returning a zero indication to incoming state controller 201 via lead ZERO2. At this point, incoming state controller 201 returns to its initial condition and awaits the receipt of another data message on communication channel 120. Since incoming state controller 201 is a microprocessor, it can also implement various maintenance routines and/or programmed interrupts to make use of the data stored in the status portion of channel control memory 212 as described above. In this fashion, channel interface circuit 100 assumes complete control for the receipt and transmission of data messages on communication channel 120.

While a specific embodiment of the invention has been disclosed, variations in structural detail, within he scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. In a data communication system wherein a communication channel (120) carries data messages, each of which contains a header field having a destination address and a virtual channel number, a processor (101) having data, address and control busses and an associated memory (102) connected to said data, address and control busses, a channel interface circuit (100) for interconnecting said data, address and control busses with said communication channel (120) comprising:
   interface means (119, 201, 204, 205) connected to said communication channel (120) and responsive to a data message appearing thereon for receiving said data message when said destination address identifies said processor (101);
   wherein said interface means (119, 201, 204, 205) includes incoming state controller means (201) responsive to said received data message for seizing said data, address and control busses;
   channel control memory means (212, 213) connected to said interface means (119, 201, 204, 205) and responsive to said received data message for translating said virtual channel number to a hardware address identifying a memory storage location in said processor memory (102);
   driver means (206) connected to both said channel control memory means (212, 213) and to said address bus and responsive to said hardware address for placing said hardware address on said address bus to activate said identified memory store location in said processor memory (102); and
   wherein said interface means (119, 201, 204, 205) is also connected to said data bus and is responsive to said received data message for directly storing the data portion of said data message as received in said activated memory store location via said data bus.

2. The invention of claim 1 wherein:
   said channel control memory means (212, 213) is additionally connected to said data, address and control busses and is responsive to said processor (101) applying said virtual channel number to said address bus for storing memory gueue data identifying available processor memory (102) space output by said processor (101) on said data bus; and
   wherein said channel interface circuit (100) includes:
   comparison means (208-210) connected to said channel control memory means (212, 213) and said driver means (206) and responsive to said received data message for applying said hardware address to said driver means (206) when said memory gueue data indicates that sufficient space is available in said processor memory (102) to store said received data message.

3. The invention of claims 1 or 2 wherein said channel interface circuit (100) includes:
   word count means (207) connected to said driver means (206) and said interface means (119, 201, 204, 205) and responsive to said received data message for incrementing said hardware address stored in said driver means (206) in synchronization with the receipt of said data message.

4. The invention of claim 3 wherein said word count means (207) is responsive to said received data message for generating an end of word indication when all of said data message has been received by said interface means (119, 201, 204, 205).

5. The invention of claim 4 wherein said interface means (119, 201, 204, 205) is responsive to said end of word indication for updating the information stored in said channel control memory means (212, 213) via said processor data, address and control busses.

6. The invention of claim 3 wherein said interface means (119, 201, 204, 205) includes:
 data buffer means (205) connected to said data bus and said interface means (119, 201, 204, 205) and responsive to said interface means (119, 201, 204, 205) for storing said received data message and for applying said received data message on a byte-by-byte basis to said data bus.

7. The invention of claim 1 wherein said channel interface circuit (100) includes:
 outgoing register means (106, 108, 110, 111) connected to said data, address and control busses and responsive to said processor (101) applying said virtual channel number to said address bus for storing outgoing memory queue data identifying the location of an outgoing message in processor memory (102) applied to said data bus by said processor (101);
 outgoing comparator means (107) connected to said outgoing register means (106, 108, 110, 111) and responsive to said outgoing memory queue data stored therein for generating a message available signal if said outgoing memory queue data indicates that an outgoing data message is stored in said processor memory (102);
 outgoing control means (103-105) connected to said outgoing register means (106, 108, 110, 111), said outgoing comparator means (107), said address and control busses, and responsive to said message available signal for transferring a hardware address from said outgoing memory queue data identifying a memory storage location in said processor memory (102) to said address bus to read said data message out of said processor memory (102); and
 wherein said interface means (119) is connected to said outgoing control means (103-105) and is responsive to same for outputting said data message which appears on said data bus on to said communication channel (120).

8. The invention of claim 7 wherein:
 said outgoing register means (106, 108, 110, 111) includes read pointer register means (110) for storing said hardware address identifying said memory storage location in said processor memory (102) containing said outgoing data message; and
 said outgoing control means (103-105) includes DMA address buffer means (104) connected to said read pointer register means (110) and to said address bus wherein said outgoing control means (103-105) is responsive to said message available signal for transferring said hardware address from said read pointer register (110) to said address bus.

9. The invention of claim 7 wherein said interface means (119, 201, 204, 205) and said outgoing control means (103-105) include processor means (201, 103) responsive to a control algorithm stored therein for regulating the operation of said channel interface circuit (100).

10. In a data communication system wherein a communication channel (120) carries data messages, each of which contains a header field having a destination address and a virtual channel number, a processor (101) having data, address and control busses and an associated memory connected to said data, address and control busses, a channel interface circuit (100) for interconnecting said data, address and control busses with said communication channel (120) comprising:
 interface means (119, 201, 204, 205) connected to said communication channel (120) and responsive to a data message appearing thereon for storing said data message when said destination address identifies said processor (101);
 wherein said interface means (119, 201, 204, 205) includes incoming state controller means (201) responsive to said received data message for seizing said data, address and control busses;
 channel control memory means (212, 213) connected to said interface means (119, 201, 204, 205) and responsive to said received data message for translating said virtual channel number to a hardware address identifying a memory storage location in said processor memory (102);
 driver means (206) connected to both said channel control memory means (212, 213) and to said processor address bus and responsive to said hardware address for placing said hardware address on said processor address bus to activate said identified memory store location in said processor memory (102); and
 wherein said interface means (119, 201, 204, 205) is also connected to said data bus and is responsive to said received data message for transferring the data portion of said data message from said interface means (119, 201, 204, 205) to said activated memory store location in said processor memory (102) via said data bus.

11. The invention of claim 10 wherein:
 said channel control memory means (212, 213) is additionally connected to said data, address and control busses and is responsive to said processor (101) applying said virtual channel number to said address bus for storing memory queue data output by said processor or said data bus; and
 wherein said channel interface circuit (100) includes:
 comparison means (208-210) connected to said channel control memory means (212, 213) and said driver means (206) and responsive to said received data message for applying said hardware address to said driver means (206) when said memory queue data indicates that sufficient space is available in said processor memory (102) to store said received data message.

12. The invention of claim 10 or 11 wherein said channel interface circuit (100) includes:
 word count means (207) connected to said driver means (206) and said interface means (119, 201, 204, 205) and responsive to said received data message for incrementing said hardware address stored in said driver means as said data message is output from said interface means (119, 201, 204, 205) to said data bus.

13. The invention of claim 12 wherein said word count means (207) is responsive to said received data message for generating an end of word indication when all of said data message has been received by said interface means (119, 201, 204, 205).

14. The invention of claim 13 wherein
said interface means (119, 201, 204, 205) is responsive to said end of word indication for updating the information stored in said channel control memory means (212, 213) via said processor data, address and control busses.

15. In a data communication system wherein a communication channel (120) carries data messages, each of which contains a header field having a destination address and a virtual channel number, a processor (101) having data, address and control busses and an associated memory (102) connected to said data, address and control busses, a channel interface circuit (100) for interconnecting said data, address and control busses with said communication channel (120) comprising:

interface means (119, 201, 204, 205) connected to said communication channel (120) and responsive to a data message appearing thereon for receiving said data message when said destination address identifies said processor (101);

wherein said interface means (119, 201, 204, 205) includes incoming state controller means (201) responsive to said received data message for seizing said data, address and control busses;

wherein said interface means (119, 201, 204, 205) includes data buffer means (205) responsive to said received data message for storing said data message as received;

channel control memory means (212, 213) connected to said interface means (119, 201, 204, 205) and responsive to said received data message for translating said virtual channel number to a hardware address identifying a memory storage location in said processor memory (102);

wherein said channel control memory means (212, 213) is additionally connected to said data, address and control busses and is responsive to said processor (101) applying said virtual channel number to said address bus for storing memory queue data output by said processor (101) on said data bus;

comparison means (208-210) connected to said channel control memory means (212, 213) and responsive to said received data message for outputting said hardware address if said memory queue data indicates that sufficient space is available in said processor memory (120) to store said data message;

driver means (206) connected to both said comparison means (208-210) and to said address bus and responsive to said hardware address for placing said hardware address on said address bus to activate said identified memory store location in said processor memory (120);

word count means (207) connected to said driver means (206) and said interface means (119, 201, 204, 205) and responsive to said received data message for incrementing said hardware address stored in said driver means (206) in synchronization with the storage of said data message in said data buffer means (205); and wherein said data buffer means (205) is also connected to said data bus and is responsive to said word count means (207) incrementing said hardware address for directly storing the data portion of said data message as received in said activated memory store location via said data bus.

* * * * *